Patented June 22, 1926.

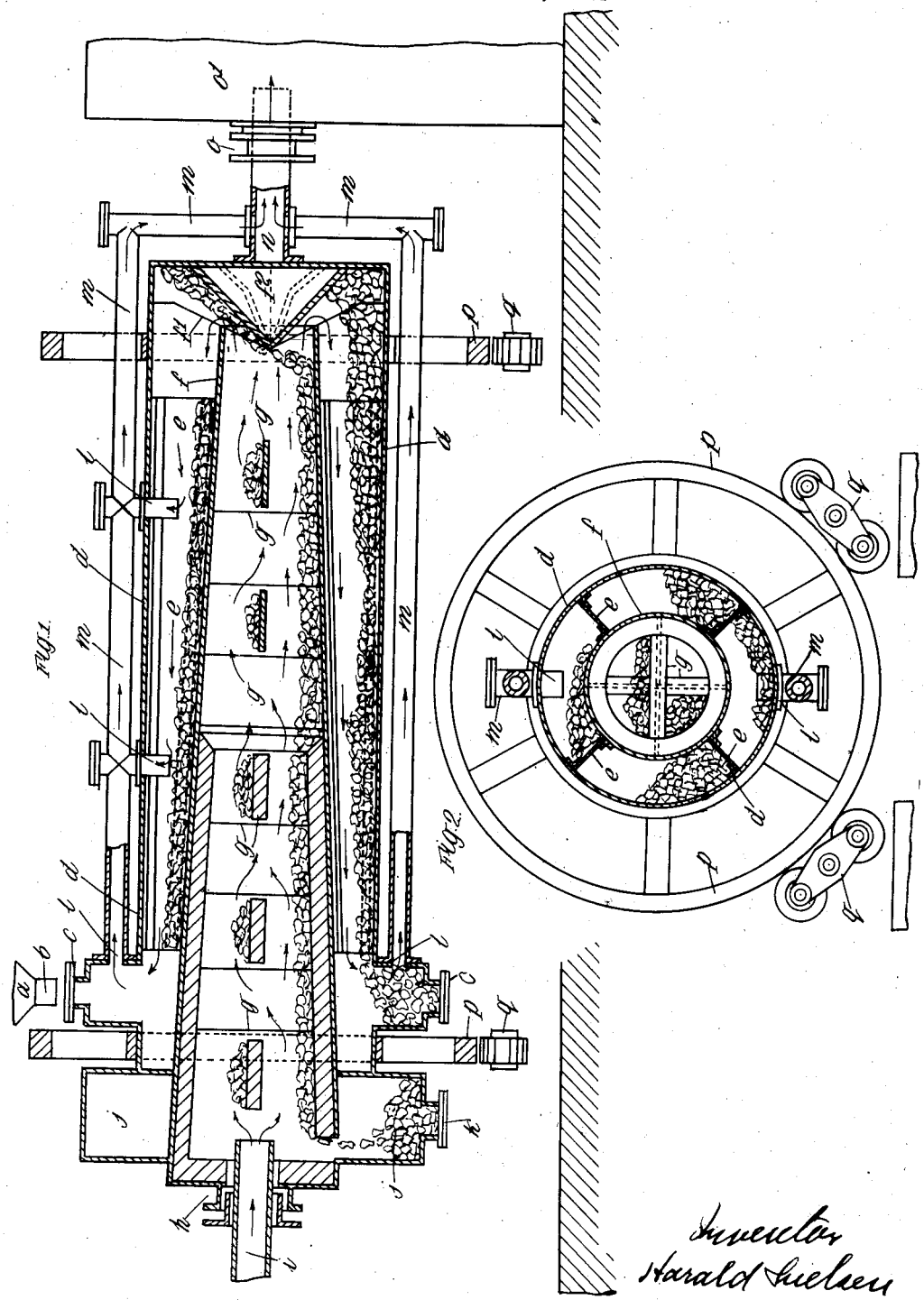

1,589,417

UNITED STATES PATENT OFFICE.

HARALD NIELSEN, OF MUSWELL HILL, LONDON, ENGLAND.

ROTARY DISTILLATION RETORT.

Application filed February 15, 1921, Serial No. 445,134, and in Great Britain January 14, 1921.

This invention relates to distilling or roasting plant and apparatus which although capable of other applications, is more particularly adapted for use in connection with methods of medium or low temperature distillation or carbonization, in which a heating medium is employed which is brought into direct contact with the material under treatment.

In methods of low temperature distillation of this character it has been proposed to employ rotary retorts which are of similar construction to the rotary kilns used in the cement industry, and the heating medium is usually constituted of combustion gases obtained from an adjacent furnace. The employment of rotary kilns of this character together with combustion gases drawn from an adjacent furnace results in a very large amount of useful heat being lost by radiation and conduction to the atmosphere, the heat losses being particularly large in that part of the retort where the temperature is highest, that is to say, nearest the source of heat. Furthermore, such known retorts are of considerable length and are cumbersome, expensive and unsatisfactory from a thermal efficiency point of view, while the tendency of the heating medium is to travel along the upper part of the retort without getting into proper contact with the material to be carbonized or distilled, thereby extending the time which is necessary to effect distillation, reducing the output, and increasing the amount of heat required. Moreover the combustion gases after having yielded up their heat are a waste product of no further utility.

According to the present invention the retort which is primarily intended for the distillation or heat treatment of solid carbonaceous materials preferably comprises two or more tubular members which are arranged around one another in a concentric or similar manner, the material to be distilled being caused to pass continuously from end to end of the tubular members, and the distillation or carbonization being preferably effected by causing the heating medium to enter the retort through the innermost of said tubular members through which it passes into the outer tubular member, and from which it is led away, together with the products of distillation, for example by means of suitable offtake pipes or ducts, to a collector which in turn is connected up to a stationary dust separator and to a hydraulic main by means of a stuffing box. Owing to this arrangement the usual drawbacks associated with low temperature retorts are dispensed with and distillation or carbonizing can be carried on at a rate which has heretofore not been possible.

The heating medium is preferably constituted of producer gas which is withdrawn directly and without ignition or combustion from an adjacent gas producer, and the so-called sensible heat of the unignited producer gas which is usually not utilized is employed to effect distillation or carbonization by being brought into direct contact with the material in the retort. As these gases on leaving the producer hold a sensible heat of from 600 to 700 degrees centigrade the waste heat available therefrom is sufficient to effect the low temperature distillation or carbonization of the material within the retort, with the additional advantage that once they have given up their sensible heat in passing through the carbonization or distillation retort they are still recoverable from the volatile products of distillation as an unimpaired fuel or power gas (carbon monoxide) etc. If desired the heating medium together with the volatile products of distillation can be removed from the retort at various points along the outer shell or casing thereof, and conducted to collectors or condensers. The carbonaceous material to be treated preferably enters the retort system through the outermost concentric tube or annulus and is carried forward, for example by gravity due to the inclination and rotation of the retort to the far end thereof where it is picked up by suitable means such as fixed shovels, buckets or plates and conveyed to the inner tubular member which may be of conical configuration in longitudinal section, the side walls of the inner concentric member being also suitably inclined in the opposite direction to the outer member. The carbonaceous material within the inner concentric conical tube is thus caused to travel in the opposite direction to that in which it passed down the outer tubular member, and also in a contrary direction to the heating medium. As the carbonaceous material travels down the concentric tubular members it passes through zones of gradually increasing temperature and the final stages of carbonization or distillation take place in the inner annular tubular member, where the heating medium enters.

The innermost tubular member may be fixed to the outer member (or members) by means of plates and angle irons so that the members form an integral whole. These plates may be solid or perforated and they may be arranged in such a manner that the annular space between the inner and outer tubular members is divided longitudinally into two or more continuous channels, or the plates may be short and staggered relatively to one another so that the annular space between the tubular members is divided up into more or less screw-like channels.

It will be understood that the carbonaceous material contained in the channels which are so formed is carried by the rotation of the retort to the upper regions thereof where the heating medium preferably travels and is brought in turn into intimate contact therewith, the heating medium being thereby utilized in the most effective manner.

As a further alternative a continuous helix or screw may be provided along the interior surface of the outer tubular member or on the exterior surface of the inner tubular member, and also if desired along the interior of the inner tubular member so as to secure a positive feed of the carbonaceous material from end to end of the retort. With such an arrangement the concentric tubular members may be cylindrical and a positive feed ensured by the relative rotation of the inner and outer tubes.

If found convenient, the inner retort tube may be provided with shelves stretching across the same in order to carry the carbonaceous material up to the crown of the tube, thereby promoting a still better contact with the heating medium. The carbonized material may be intermittently or continuously discharged into an annular collecting box fixed to the inner retort tube, from which box the carbonized material can be removed from time to time.

The charging of the raw carbonaceous material can preferably be effected intermittently through charging doors situated in the outer retort tube, and the retort be supported by rollers and revolved or rotated by any well known means.

In order that the said invention may be clearly understood and readily carried into effect the same will now be described more fully with reference to the accompanying drawing which shows by way of example one embodiment of the invention and in which:—

Figure 1 is a longitudinal section of the improved retort, and,

Figure 2 is a cross section of part thereof.

$a$ is the hopper or container for the carbonaceous material to be treated, $b$ is an outlet from said hopper $a$, $c, c$ are charging doors through which the material is admitted to the retort, $d$ is the outer shell of the retort, $e, e$ are gusset plates firmly fixed to $d$ and supporting the inner concentrically mounted conical retort tube $f$. $f'$ and $f^2$ are fixed shovels or buckets for charging the inner tube $f$ with carbonaceous material from the annular chamber which is formed between the outer shell $d$ of the retort and the inner tube $f$. $g, g$ are transversal shelves or plates of any well known form located within the tube $f$. $h$ is a stuffing box through which the inlet pipe $i$ for the heating medium enters. The retort tube $f$ as shown is lined with firebrick at the end adjacent to the inlet pipe $i$, said pipe $i$ being preferably in communication with a gas producer (not shown). $j$ is the collector for the carbonized material or residuum from the destructive distillation. $k$ is the discharge door for same. $l, l$ are the gas offtakes and $m, m$ are offtake pipes which are connected to the rotating gas collecting pipe $n$, which through the stuffing box $o$ enters a stationary dust chamber $o'$. $p, p$ are runner bands located around the retort which run on rollers $q, q$.

Owing to this construction and arrangement of the parts of the retort the heat usually lost by radiation from the hottest zone, that is to say the inner tubular member, is conserved and made use of in the outer annulus by direct conduction to the carbonaceous material contained within the same. As, therefore, the outer surface of the retort where the real heat losses by radiation to the atmosphere takes place has only a very moderate temperature the heat losses within the retort itself are very small, and the outer tubular member serves in fact as a heat jacket for the inner tubular member. Furthermore, it will readily be understood that by employing a retort as aforesaid containing as in the example given one inner tubular member, the overall length of the retort is only one half of that of a single retort with the same length of travel of the carbonaceous material and consequently the radiation surface through which heat losses can occur is greatly diminished.

What I claim and desire to secure by Letters Patent of the United States is:—

A retort for the medium and low temperature distillation of carbonaceous materials by contact with a heating medium which is passed through the retort comprising an outer cylindrical member and an inner concentrically mounted conical member fixed to said outer cylindrical member, and means for feeding material from the outer cylindrical member to the inner conical member.

HARALD NIELSEN.